United States Patent
Toth et al.

[11] 3,791,199
[45] Feb. 12, 1974

[54] ULTRASONIC INSPECTION METHOD AND APPARATUS

[75] Inventors: James M. Toth, Euclid; Tyler W. Judd, Chardon, both of Ohio

[73] Assignee: Republic Steel Corporation, Cleveland, Ohio

[22] Filed: Aug. 1, 1969

[21] Appl. No.: 846,819

[52] U.S. Cl. ................................................. 73/67.9
[51] Int. Cl. ........................................... G01n 29/04
[58] Field of Search ............................ 73/67.5–67.9

[56] References Cited
UNITED STATES PATENTS

| | | | |
|---|---|---|---|
| 3,221,544 | 12/1965 | Gunkel | 73/67.8 |
| 3,237,446 | 3/1966 | Wood | 73/67.9 |
| 3,262,123 | 7/1966 | Crouch | 73/67.8 X |
| 3,478,308 | 11/1969 | Stanley et al. | 73/67.7 X |
| 3,481,186 | 12/1969 | Cellitti et al. | 73/67.9 |
| 3,512,399 | 5/1970 | Weinbaum | 73/67.5 |

*Primary Examiner*—Richard C. Queisser
*Assistant Examiner*—John P. Beauchamp
*Attorney, Agent, or Firm*—Cooper, Dunham, Clark, Griffin and Moran

[57] ABSTRACT

Testing method and apparatus, incorporating a pair of transducers positioned on opposite sides of a weld seam. The transducers are alternately energized, and signals from the transducers are gated to develop signals representative of defects in various regions of the workpiece under test. Individual references are established for the different regions, and the signals are compared with the associated references. Output signals representing major defects are generated in accordance with various relationships of signals from the different regions of the workpiece.

10 Claims, 9 Drawing Figures

INVENTORS
JAMES M. TOTH
TYLER W. JUDD
BY Robert Scoley
ATTORNEY

ULTRASONIC INSPECTION METHOD AND APPARATUS

BACKGROUND AND BRIEF DESCRIPTION OF THE INVENTION

This invention relates to testing methods and apparatus. More particularly it relates to the ultrasonic testing of specimens, such as welded pipe.

In the testing of welded pipe to determine defects, it is important to be able to make a determination of the defects encountered before an output indication is given that a major defect has been encountered. In the past the ultrasonic analysis of specimens has generally been achieved with no other criterion for the classification of a defect other than the amplitude of a signal reflected by a defect within the specimen under test. In the present invention signals from different regions of a workpiece are analyzed and compared with established thresholds for predetermined relationships before an output indication is generated indicating the existence of a flaw (a major or rejectable defect). Such procedure permits a greater analysis of signals and the better classification of defects.

The invention also utilizes a coupling indicator circuit which provides an indication of the coupling taking place between testing transducers and the specimen or workpiece under test. The coupling indication signal is utilized along with the defect signals developed in the analyzing of information.

Brown et al U.S. Pat. No. 3,041,872, issued July 3, 1962, discloses apparatus for the ultrasonic testing of materials utilizing gating for the inspection of different regions in a workpiece, as well as automatic gain control to overcome the effects of poor coupling. This patent is representative of the prior art in which the amplitude of a signal is used to define a fault. Establishing different references for different regions and the simultaneous utilization of these references, as in the present invention, is not suggested.

Gordon et al U.S. Pat. No. 3,050,988, issued Aug. 28, 1962, discloses an ultrasonic testing arrangement involving ultrasonic transducers positioned on opposite sides of two adjacent edges of a plate that are to be welded together. The arrangement is specifically for the positioning of the welding electrode and utilizes a comparison of signals from the adjacent edges to achieve proper positioning. The analysis of signals from different regions of a workpiece in order to classify defects is not suggested in this patent.

Sproule U.S. Pat. No. 2,969,671, issued Jan. 31, 1961, is directed to an ultrasonic flaw detector. The location and severity of a flaw is indicated by the circuitry of the patent. The amplitude of the echo signal as received from a region is representative of the severity of the defect. Again, as in the other prior art patents, there is no comparison of defects in various regions with respective thresholds leading to the generation of an output flaw signal.

Stebbins et al, U.S. Pat. No. 3,164,007, issued Jan. 5, 1965, is directed to the ultrasonic inspection of workpieces. This patent utilizes a signal gating technique to classify signals according to different regions of the workpiece under test. Digital signals of different amplitude are generated, based on the different regions. There is no comparison of defect signals from different regions with respective thresholds as in the present invention.

Martner U.S. Pat. No. 3,335,602, issued Aug. 15, 1967, is directed to the identification of bond defects. This patent utilizes an ultrasonic testing procedure in which frequency is varied over a range of frequencies and resonance peaks in a detected signal are noted. Various relationships between the resonance peaks are utilized to classify the defects. This comparison technique, however, does not suggest the comparison of signals from different regions of a workpiece with respective thresholds for the purpose of defect categorization.

The present invention accordingly has for an object the categorization of defects within a workpiece.

Another object of the invention is to carry out defect analysis through a comparison of signals from different regions of the workpiece with respective thresholds.

These and other objects of the invention are carried out, as noted generally above, by classifying ultrasonic signals according to region in a workpiece and comparing the signals from various regions with respective thresholds in order to develop information regarding defects within the workpiece.

DETAILED DESCRIPTION

Figure 1:
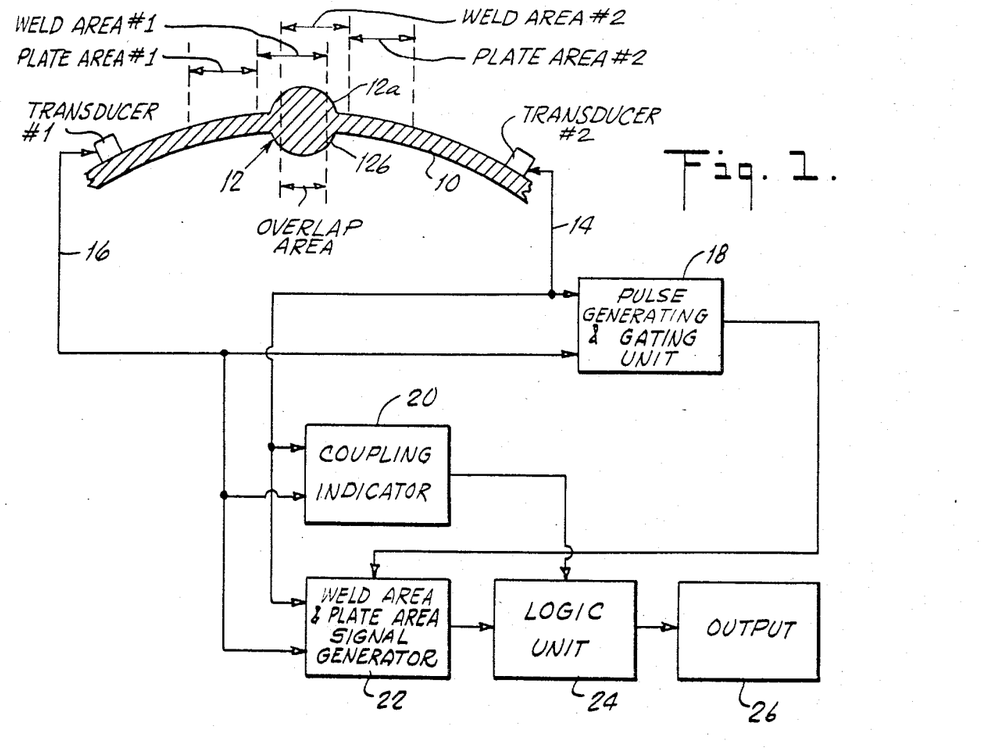
FIG. 1 is a block diagram of a testing system in accordance with the invention, showing a portion of a workpiece under test.

FIG. 1

FIG. 1 shows a representative system in accordance with the invention. A pipe 10 is shown against which are positioned two ultrasonic transducers, designated transducer No. 1 and transducer No. 2. The transducers are utilized for the testing of weld seam 12, typically consisting of a seam portion 12a on the outside of the pipe and a seam portion 12b on the inside of the pipe. Each of the transducers may be composed of one or more transducer elements positioned within a housing and ultrasonically coupled to the pipe 10 by a liquid film from a source (not shown). Transducer No. 1 injects signals into the pipe which are useful in testing two areas of the pipe. The first area is designated weld area No. 1 and includes the major portion of the weld seam that is closest to that transducer as well as a minor portion of the pipe adjacent to the main body of the weld seam. The second area is designated plate area No. 1 and is an area of the pipe commencing from the edge of weld area No. 1 closest to transducer No. 1 for a distance typically chosen so that plate area No. 1 and weld area No. 1 encompass the same amount of pipe. The limits of weld area No. 1 and plate area No. 1 are delineated by gating techniques as will be set forth in more detail below.

Transducer No. 2 is similarly positioned on the other side of the weld seam 12 for the purpose of testing weld area No. 2 and plate area No. 2 corresponding to the weld and plate areas tested by transducer No. 1. It will be noted that there is an area of overlap, designated overlap area, in FIG. 1, representing the common portion of the weld seam 12 that is tested by both the transducers.

The transducers are coupled by conductors 14 and 16 to a pulse generating and gating unit 18. This unit generates pulse signals which are applied to the transducers to activate the transducers which in turn introduce pulse signals into the pipe 10. Signals are received by each of the transducers both by through transmission from one transducer to the other and by reflection or echo of a signal from one transducer back to that same transducer. These through and echo signals are transmitted by the transducers 1 and 2 via conductors 14 and 16 to a coupling indicator 20 and a weld area and plate area signal generator 22.

The coupling indicator 20 utilizes a "through transmission" of signals from one transducer to the other to provide an indication of the coupling between the two transducers and the pipe 10, i.e., the quality of the transmission of ultrasonic signals from one of the transducers through the liquid film coupling that transducer to the pipe and finally through the film coupling the other transducer to the pipe and ending at the other transducer. Signals representative of the quality of coupling are applied by the coupling indicator 20 to a logic unit 24 for utilization in the analysis of defects in the pipe 10. The coupling indicator 20 carries out the analysis of the quality of coupling between transducers and pipe 10 while the testing of the pipe is achieved through echo signal reception by the transducers.

A weld area and plate area signal generator 22 is a signal system under the control of the pulse generator and gating unit 18. The signal generator 22 gates the signals received from the transducers No. 1 and No. 2 so that the signals may be classified according to the different regions of the workpiece under inspection. In FIG. 1 these four regions are the weld areas No. 1 and No. 2 and the plate areas No. 1 and No. 2. Echo signals as classified according to workpiece region are applied to logic unit 24 which compares these signals with preestablished references. Typically the references differ for the various regions of the workpiece, which aids in the classification of defects. The logic unit establishes criteria which must be satisfied before a defect recognized in a certain region is classified as a rejectable flaw.

The logic unit 24 is coupled to an output block 26 representing any suitable form of output of the system. Typically the block 26 includes visual indication of flaws as well as alarms and marking apparatus suitable respectively for notifying personnel of various conditions and for marking the pipe in response to noted flaws.

Figure 2:
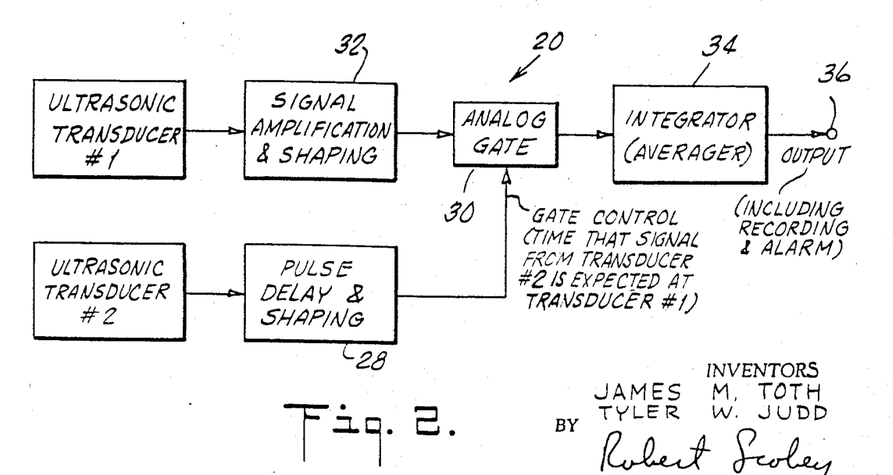
FIG. 2 is a block diagram of a coupling indicator circuit useful in the system of FIG. 1.

FIG. 2.

FIG. 2 is a block diagram of a representative coupling indicator circuit 20 useful in the system of FIG. 1. The system is established to analyze the through transmission of signals from transducer No. 2 to transducer No. 1. Signals from the ultrasonic transducer No. 2 are applied to a pulse delay and shaping network 28 which generates an output pulse that is applied to analog gate 30. The pulse from the unit 28 is a gate control pulse that occurs at the time that the through signal from transducer No. 2 is expected at transducer No. 1. Accordingly the analog gate receives a signal from the ultrasonic transducer No. 1 after suitable amplification and shaping by a unit 32. The analog signal from the unit 32 is passed through the analog gate 30 during the gating interval and is applied to an integrator or averager 34. The averager smooths out temporary fluctuations in the signal from the analog gate 30 and generates an output signal at an output 36. The amplitude of the signal at the output 36 is representative of the quality of coupling between the transducers and the workpiece. In particular, as the coupling becomes poorer, the amplitude of the signal at the output terminal 36 decreases.

As noted, the averaging smooths out the signal from the analog gate so that temporary signal fluctuations are discounted. Without such averaging, temporary signal fluctuations would have an adverse effect on any system utilizing the coupling signal.

Figure 3:
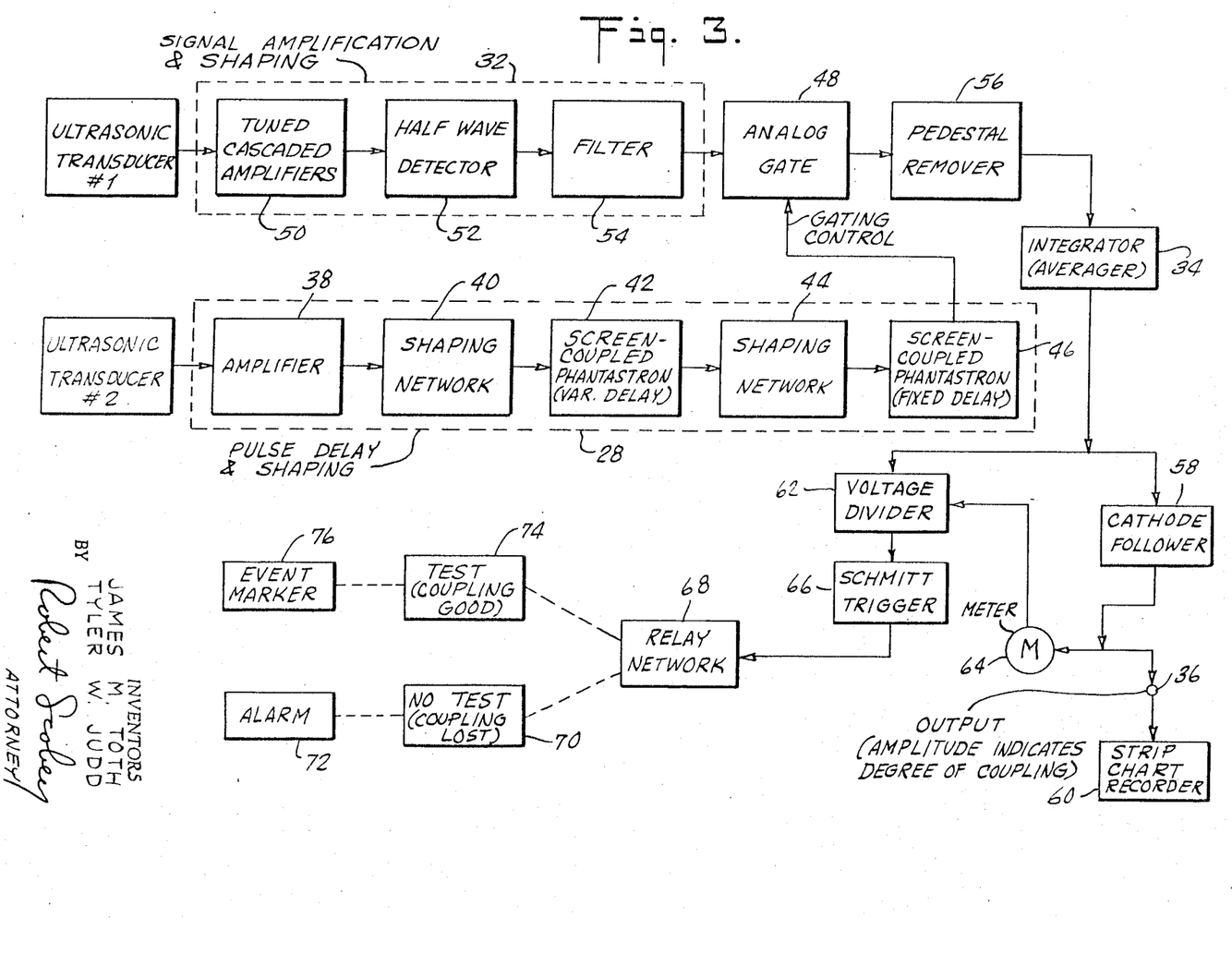
FIG. 3 is a block diagram showing representative further details of a coupling circuit as set forth in FIG. 2.

FIG. 3

FIG. 3 shows the details of a circuit as set forth in FIG. 2. The pulse delay and shaping unit 28 is formed of an amplifier 38 which amplifies the signal from ultrasonic transducer No. 2. The signal applied to the amplifier 38 is the main pulsing signal that energizes transducer No. 2. The amplified pulsing signal is shaped by a shaping network 40 which may be of resistance-capacitance-diode configuration. The signal from the shaping network 40 is applied to a screen coupled phantastron delay circuit 42. This circuit is of conventional construction as described in Pulse and Digital Circuits, Millman and Taub, Section 7—7 (McGraw-Hill Book Company, Inc., 1956). The delay circuit 42 produces an output pulse, the trailing edge of which is displaced in time from the input pulse signal. The time delay is adjusted by varying the voltage at the plate of the tube comprising the phantastron. Typically the plate is clamped to a variable potential source by a diode.

The output from the screen coupled phantastron (typically taken from the screen grid of the tube) is applied to a shaping network 44 which may be a resistance-capacitance-diode network which shapes the trailing edge of the pulse from the phantastron circuit 42. The signal from the shaping network 44 is applied to another screen coupled phantastron circuit 46, typically of fixed delay. In practice the phantastrons 42 and 46 are adjusted so that the phantastron 46 generates an output pulse the leading edge of which occurs slightly before the time that the through-transmitted signal from transducer No. 2 reaches transducer No. 1 and terminates shortly thereafter. The output pulse from the phantastron 46 is applied as the gating control pulse to an analog gate 48 (corresponding to gate 30 in FIG. 2). This analog gate receives its analog input from the signal amplification and shaping network 32 connected to the ultrasonic transducer No. 1.

The network 32 is comprised of tuned cascaded amplifiers 50, tuned to the carrier frequency of the ultrasonic signal from transducer No. 1. The gain of the amplifier section is typically variable. The signal from the amplifier 50 is applied to a half-wave detector 52 which passes one-half of the input signal (of appropriate polarity) which is then applied to a filter 54 which may be capacitive and inductive. The filter 54 removes the carrier frequency. The signal from the filter 54 is thus comprised of a series of unidirectional pulses which are applied to the analog gate 48. As noted above, the gating control pulse from the phantastron circuit 46 occurs just before and after the time during which the through-transmitted signal from transducer No. 2 is expected at transducer No. 1. Thus the analog gate 48 passes only that pulse signal that is through-transmitted from transducer No. 2.

The signal from the analog gate 48 is applied to a pedestal remover circuit 56 which may be formed from a diode clamp which removes the pedestal from the output signal of the analog gate. The pedestal is a rectangular pulse of fixed height upon which the desired pulsing is superimposed. The output pulses from the pedestal remover 56 are applied to the integrator 34 shown also in FIG. 2. The integrator may comprise a diode and capacitance-resistance network.

The signal from the integrator has an amplitude which varies in accordance with the amplitude of the pulse signals applied thereto. The effect of the integrator is to smooth out any variations in the input signal so that the circuit is not subject to temporary fluctuations in input signal.

The signal from the integrator 34 is applied to a cathode follower 58. The signal from the cathode follower is applied to the output 36 shown also in FIG. 2. The amplitude of the signal at the output 36 represents the degree of coupling. As the quality of coupling lessens, the signal at the terminal 36 decreases in amplitude. A strip chart recorder 60 may be coupled to the terminal 36 to provide a continuous indication of the quality of coupling between the two transducers and the workpiece.

The signal from the integrator 34 is also applied to a voltage divider 62 typically resistive and capacitive. The voltage divider also receives a feedback signal from the cathode follower 58 applied through a meter 64. The meter 64 provides a visual indication of the degree of coupling. The signal from the voltage divider 62 is applied to a Schmitt trigger 66. The Schmitt trigger generates two levels of output signal based on the relationship of the input signal applied thereto to a predetermined threshold level. The threshold level for the Schmitt trigger represents a predetermined degree of coupling between transducers. If that coupling is not achieved, the Schmitt trigger controls a relay network 68 so that a no test (coupling lost) indicator 70 is activated which in turn may activate an alarm 72. If the predetermined coupling level is achieved, however, the relay network causes a test indicator 74 (coupling good) to be activated which in turn may activate an event marker 76.

It should be noted that the feedback between the output of cathode follower 58 and the voltage divider 62 is a form of boot-strapping which increases the sensitivity of the Schmitt circuit to variations in the signal from the integrator 34.

Figure 4:
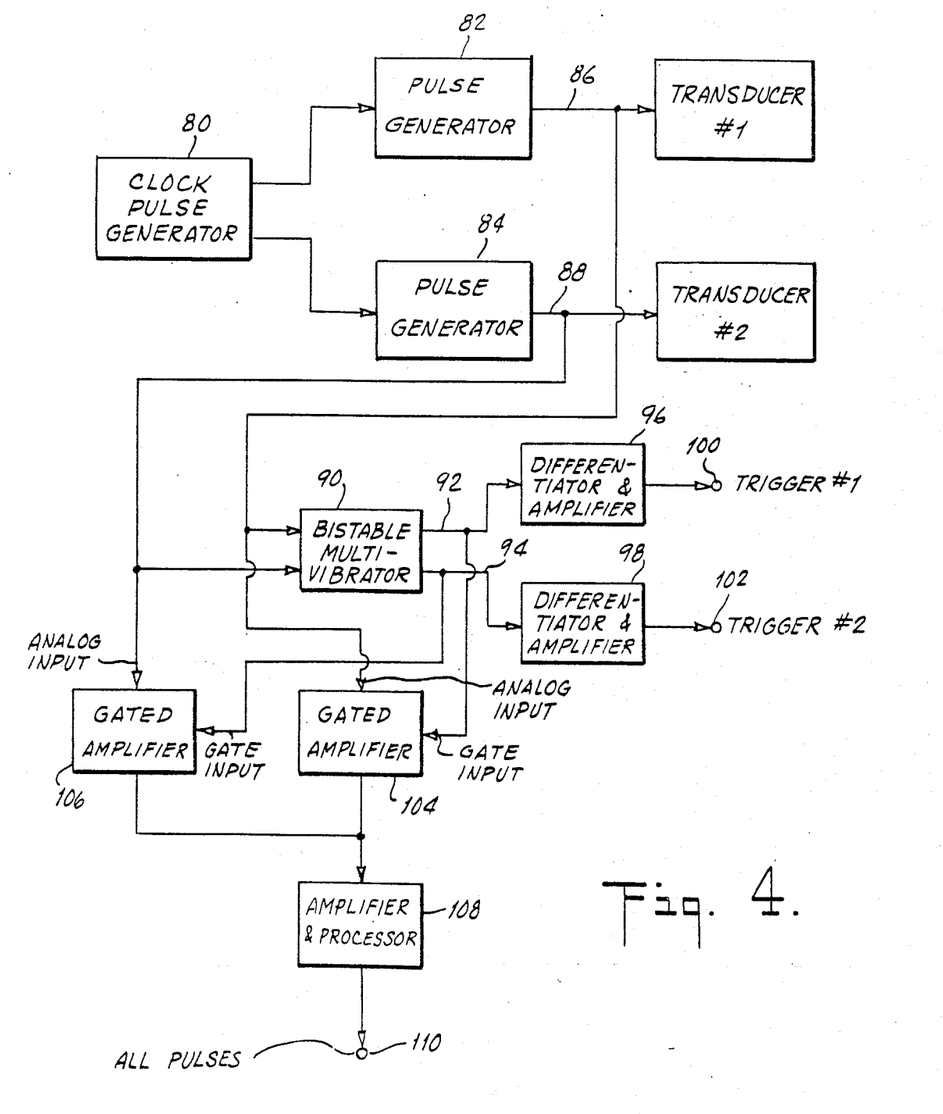
FIG. 4 is a block diagram of representative details of a pulse generating and gating unit and part of a weld area and plate area signal generator useful in the system of FIG. 1.

FIG. 4

FIG. 4 shows the details of a representative pulse generating and gating unit 18 of FIG. 1 and a representative part of the weld area and plate area signal generator 22 of FIG. 1. A clock pulse generator 80 generates a series of time-spaced pulses applied to pulse generators 82 and 84. These pulse generators in turn are coupled by conductors 86 and 88 to transducer No. 1 and transducer No. 2 to provide pulse signals which alternately activate the transducers. The conductors 86 and 88 coupling together the pulse generators and transducers form trigger inputs of a bistable multivibrator 90. The bistable multivibrator generates outputs on conductors 92 and 94 connected respectively to differentiator and amplifier units 96 and 98. The outputs of the differentiator and amplifier units appear at terminals 100 and 102 (designated trigger No. 1 and trigger No. 2).

The operation of the bistable multivibrator 90 and the differentiator and amplifier units is as follows: Concurrently with the activation of transducer No. 1 by the pulse generator 82, the energizing signal on conductor 86 triggers the bistable multivibrator to one stable mode of operation in which conductor 92 is active. The differentiator and amplifier unit 96 produces an output pulse at the terminal 100 concurrently with the activation of transducer No. 1.

When the transducer No. 2 is activated by a pulse signal on conductor 88, that signal triggers the bistable multivibrator 90 to its second stable condition in which output conductor 94 is active. The rendering active of that conductor results in a pulse signal at terminal 102 by the differentiator and amplifier unit 98.

Typically the pulse signals trigger No. 1 and trigger No. 2 are concurrent with the leading edges of the pulse signals generated by the pulse generators 82 and 84, i.e., the signals trigger No. 1 and trigger No. 2 are generated concurrently with the activation of transducers No. 1 and No. 2.

The conductors 86 and 88 in FIG. 4 are also applied as analog inputs to gated amplifiers 104 aNd 106. The gating inputs to these amplifiers, determining the times during which the amplifiers pass signals, are the output conductors 92 and 94 from the bistable multivibrator 90. Each of the amplifiers is thus gated ON for a time commencing with the activation of the associated transducer No. 1 or No. 2 and remains on until the activation of the other transducer. The outputs of the gated amplifiers 104 and 106 are coupled to an amplifier and processor 108 (typically including RF amplification, detection and pulse amplification) which generates output signals at an output terminal 110 designated "all pulses". The signal at the output terminal 110 is representative of all pulses either applied to the transducers No. 1 and No. 2 to activate these transducers or as generated by the transducers upon the receipt of signals by the transducers from the specimen under test.

Figure 5:
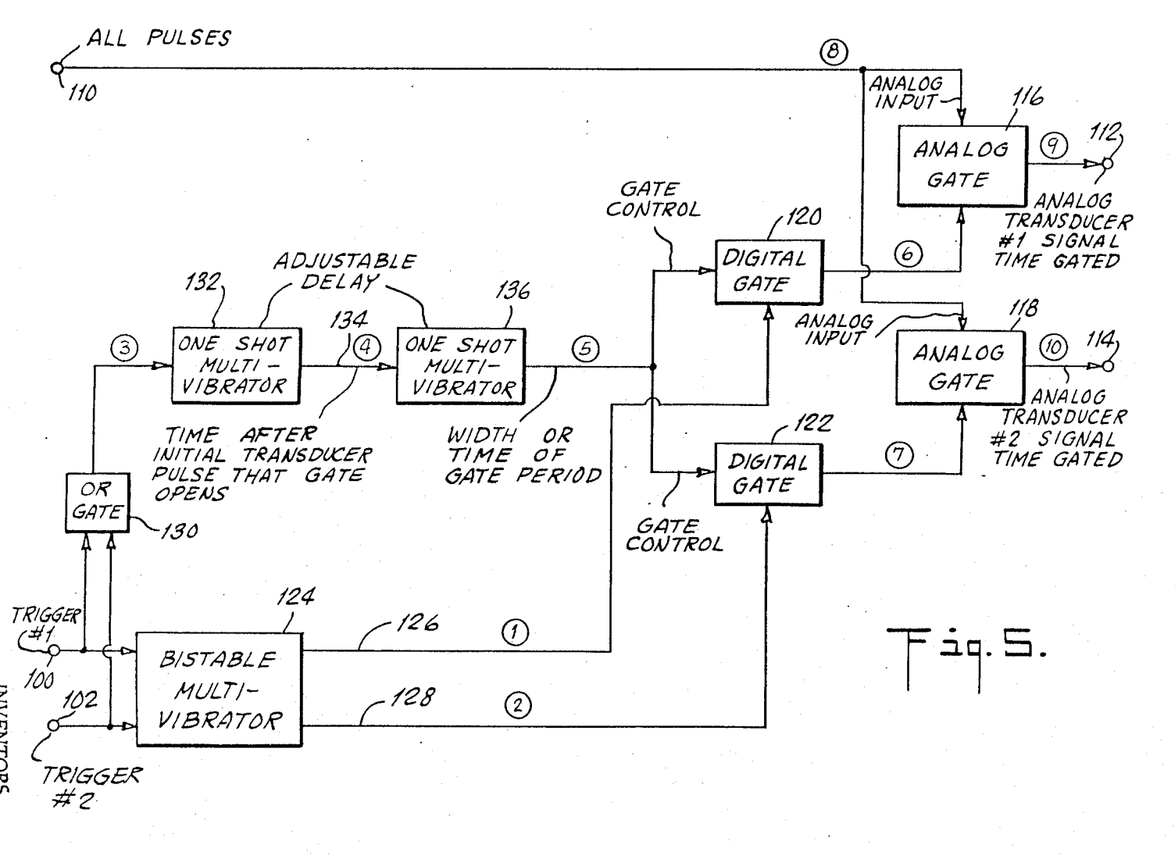
FIG. 5 is a block diagram of the major portion of a representative weld area and plate area signal generator useful in the system of FIG. 1.

FIG. 5

The signals trigger No. 1, trigger No. 2 and "all pulses" generated at the output terminals 100, 102 and 110 of FIG. 4 are utilized in the system of FIG. 5. FIG. 5 shows a major portion of a representative weld area and plate area signal generator 22 of FIG. 1. The circuit of FIG. 5 is specifically intended to generate output signals at terminals 112 and 114 representing signals from the transducers No. 1 and No. 2 and for different regions of the workpiece under test. In particular, there are two circuits such as shown in FIG. 5 for developing signals from the four regions designated weld area No. 1 and weld area No. 2 (one circuit), plate area No. 1 and plate area No. 2 (other circuit) in FIG. 1. The classification of signals by region within the workpiece is accomplished by time gating in the circuit of FIG. 5, as will now be explained.

In FIG. 5 the "all pulses" signal at terminal 110 is applied as the analog input to two analog gates 116 and 118. The analog gates transmit the applied signal from the terminal 110 only when they are activated by gating signals applied thereto from digital gates 120 and 122. The digital gates in turn receive signals from a bistable multivibrator 124 which has two output conductors 126 and 128. The output conductor 126 is rendered active, enabling the digital gate 120 at the time trigger No. 1 appears at terminal 100. As noted above, the signal trigger No. 1 is generated concurrently with the leading edge of the signal activating transducer No. 1. Similarly output conductor 128 of the bistable multivibrator 124 is rendered active when the bistable multivibrator has been triggered to its second stable state by the signal trigger No. 2 appearing at terminal 102. Thus the digital gate 122 has an input signal applied thereto commencing from the time that the transducer No. 2 is activated.

The signal trigger No. 1 and trigger No. 2 are also coupled by an OR gate 130 to a one-shot multivibrator 132. The multivibrator 132, which may be of adjustable delay, generates an output pulse signal on conductor 134 that commences a predetermined period of time after the multivibrator has been energized by one of the pulses from the OR gate 130. This pulse is applied to another one-shot multivibrator 136 which generates a pulse signal that serves as the gate control of digital gates 120 and 122. The multivibrator 136 may be made with an adjustable delay as is the multivibrator 132.

The signal from the multivibrator 132 is chosen to commence a predetermined time after the activation pulse applied to each transducer No. 1 and No. 2 in FIG. 1. This determines the time that each of the digital gates 120 and 122 is first opened. The time during which the gate remains open is determined by the multivibrator 136. Thus it is noted that the digital gates 120 and 122 are enabled by the gate control signals from multivibrator 136 in turn to enable the analog gates 116 and 118 for predetermined periods, each period commencing after the activation of the corresponding one of transducers No. 1 and No. 2 and persisting for a predetermined gating period.

As noted above, there is a circuit such as shown in FIG. 5 for each of the two groups of areas shown in FIG. 1 (one group is the two weld areas and the other group is the two plate areas). The adjustable delay features in the multivibrators 132 and 136 determine the times that each circuit is active. In particular, one set of delay periods is chosen so that in one circuit the signals at the terminals 112 and 114 from the two analog gates are representative of signals from weld areas No. 1 and No. 2. In the other circuit the delay periods are chosen so that the signals from the analog gates are from the plate areas No. 1 and No. 2.

By suitable variation of the delay periods, various regions of the specimen under test can be interrogated. In FIG. 1 weld areas No. 1 and No. 2 include an area of overlap. It may be desirable to render both weld areas completely overlapping; alternatively it may be desirable to include no overlap in certain circumstances. By the same token, the plate areas may be varied so that they need not abut the corresponding weld areas but rather commence at points displaced from the edges of the weld areas. The definitions of the zones in the workpiece that are under interrogation may be varied in accordance with the requirements and characteristics of a particular workpiece under test. Because of the variations that may be desirable, it may also be desirable to divide the circuit of FIG. 5 into two component units each having its own separate one-shot multivibrators 132 and 136 rather than the common units shown in FIG. 5. In this fashion, the gating periods may be changed completely so that the two weld areas, for example, bear no relation to one another.

Figure 5A:
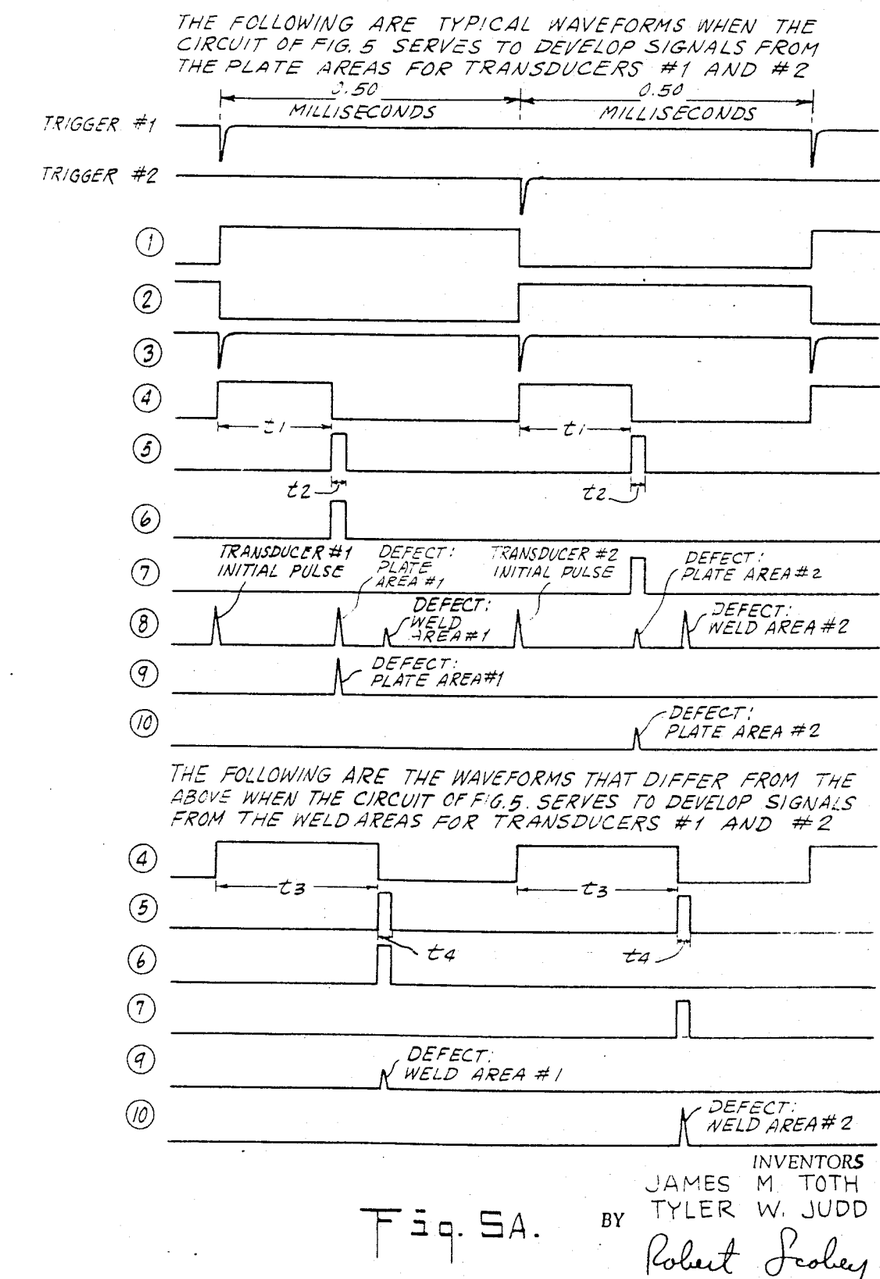
FIG. 5A is a series of waveform diagrams of representative signals generated by circuits such as shown in FIG. 5.

FIG. 5A

FIG. 5A includes a series of waveform diagrams of representative signals generated by the circuit of FIG. 5. The two uppermost waveforms represent the signals trigger No. 1 and trigger No. 2 appearing at terminals 100 and 102 in FIG. 5. A representative time spacing of 0.50 milliseconds between trigger signals is indicated.

In FIG. 5A the identification numbers to the left of each waveform correspond to the numbers in FIG. 5 adjacent various output conductors and indicate at what point in FIG. 5 each signal occurs.

The first group of ten waveforms beneath the trigger No. 1 and trigger No. 2 waveforms shows representative signals from the different components of FIG. 5 when the circuit of FIG. 5 serves to develop signals from the plate areas associated with transducers No. 1 and No. 2. The lowermost group of the waveforms are those obtained when the circuit of FIG. 5 serves to develop signals from the weld areas associated with the two transducers.

The following should be noted:

a. $t1$ is the time which determines the location of each plate area for transducers No. 1 and No. 2.

b. $t2$ represents the width of each plate area for transducers No. 1 and No. 2.

c. $t3$ is the time which determines the location of each weld area for transducers No. 1 and No. 2.

d. $t4$ represents the width of each weld area for transducers No. 1 and No. 2.

Representative defect signals have been shown in FIG. 5A.

Figure 6:
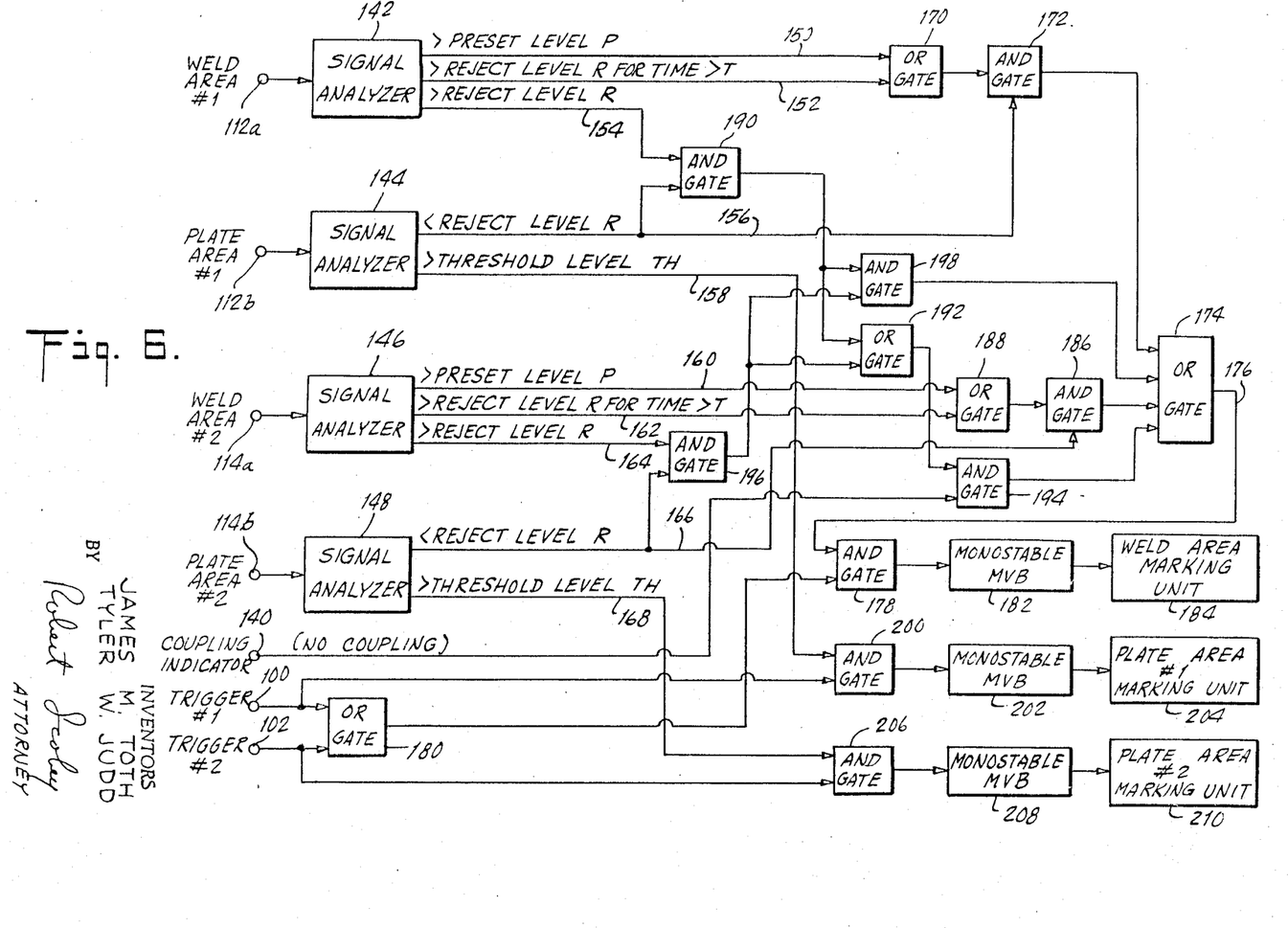
FIG. 6 is a block diagram of a representative logic unit as shown in FIG. 1.

FIG. 6

The circuit of FIG. 6 utilizes the various weld area and plate area signals, a coupling indication signal and trigger signals in order to develop information regarding various defects as detected in different regions of the workpiece under test. Terminals 112a and 114a, respectively, receive signals from a circuit such as shown in FIG. 5 representative of signals within weld areas No. 1 and No. 2. Terminals 112b and 114b receive signals from another circuit such as shown in FIG. 5 representative of signals within the plate areas No. 1 and No. 2. Terminal 140 receives a coupling indication signal such as from the circuit of FIG. 3, in particular, from the no test block 70 of FIG. 3. Thus the signal at the terminal 140 is active when coupling has been lost, i.e., the degree of coupling has fallen below a predetermined quality of coupling. The remaining two inputs to the circuit of FIG. 6 are trigger No. 1 and trigger No. 2 at terminals 100 and 102 from the circuit of FIG. 4.

The circuit of FIG. 6 carries out a signal analysis and comparison. In particular, signals from each of the regions under test, namely, the two weld areas and the two plate areas, are analyzed and compared with thresholds and output signals are developed representative of the comparisons if various criteria are met. The following discussion will be helpful to an understanding of the circuit of FIG. 6.

Some defects in welded pipe, for example, are as follows: non-fusion (in the central area of a weld bead) and slag inclusions, which can occur near the edges of a weld bead, both of which may be elongated. Other defects are gas pockets, edge breaks or cracks, laminations in the plate (planar discontinuities occurring near the edges of the plate), pinholes (gas pockets at the surface of a workpiece) and nonmetallic inclusions such as dirt and the like which appear to migrate to the edge of a plate during the rolling process. The non-metallic inclusions, in particular, may remain along the edges of a plate, even if the plate has been trimmed along its edges, especially if trimming is not sufficient. Such inclusions are deleterious when the edges of the plate are abutted and then welded together, for example, in the fabrication of welded pipe.

It has been found desirable to establish the following conditions for the generation of flaw signals:

1. Signals from either weld area No. 1 or No. 2 exceed some preset level P;
2. Signals from either weld area exceed some lower reject level R for a time greater than T seconds;
3. Signals from either weld area are greater than the reject level R and it has been determined that the quality of coupling between transducers and workpiece has fallen below some predetermined level;
4. Signals from both weld areas are greater than the reject level R;

provided that in any of the above conditions 1 to 4, the signals from the plate area on the same side of the weld are less than the reject level R;

5. Signals from a plate area are greater than a predetermined threshold level TH.

In the above conditions a preset level P, a reject level R, a time T, and a threshold level TH have been mentioned. Typically the levels P, R and TH are related to the signal that is generated when ultrasonic signals encounter a standard defect. For example, a ⅛ inch diameter hole may be drilled through a weld bead in order to constitute a standard defect. Full scale deflection in a meter or on an oscilloscope from signals encountering this defect may be considered to correspond to the threshold level TH. The reject level R may represent one-third full scale deflection and the preset level P may represent some level within the region from one-third to full scale deflection. These indications of signal level are illustrative.

In the satisfying of condition 1 above, namely, that either weld area produces signals greater than some preset level P, it is considered that a defect has been noted which is sufficiently severe to justify the generation of an output flaw signal. The proviso that signals from the plate area on the same side of the weld are less than the reject level R compensates for the condition in which a lamination in a plate area gives a false indication of a defect in the weld area.

Condition 2 above, namely, that the signal from either weld area is greater than the lower reject level R for a time greater than T seconds, proceeds on the assumption that lesser defects than those of condition 1 will be tolerated unless they persist for a time greater than T seconds, which may be related to the length of a flaw. In particular, if pipe is being moved past a pair of testing transducers that test the weld bead therebetween, the time T is related to defect length by the speed of movement of the pipe. As in condition 1, the plate area signal from the same side of the weld must be less than the reject level R in order for an output indication to be given in order to compensate for false indications of defects in the weld area caused by laminations in the plate area.

In condition 3 an output indication is provided in the event that either weld area produces signals that are greater than the lower reject level R and coupling is indicated as being below the predetermined quality level desired for good operation. In effect this condition compensates for the poor coupling, inasmuch as with proper coupling the signal would be greater than the reject level R. Again in this condition the compensation for laminations in the plate area is provided.

In condition 4 the criterion is that both weld areas provide signals greater than the lower reject level R.

In accordance with the weld area regions shown in FIG. 1, both weld areas simultaneously providing signals greater than the reject level R, represent either one defect in the central area of the weld (the overlap area in FIG. 1) or two defects, each in one of the side portions or non-common portions of the weld areas. For example, a defect could be present in the non-common portion of weld area No. 2 to the right of the overlap area, and another defect could be present in the non-common portion of weld area No. 1 to the left of the overlap area. In any event, these conditions will all result in signals in both weld areas. However, it is considered that the likelihood of two defects simultaneously occurring in the two non-common portions of the weld areas is sufficiently unlikely so as to warrant the test criterion specified. In most cases the presence of signals from both weld areas greater than the reject level indicates a flaw in the overlap area of the weld.

It is to be noted then that defects in the overlap area of the weld are considered more serious than defects in the edges of the weld, since the lower reject level R is the signal criterion for defects in this area, while other criteria must be satisfied in the edge areas, namely, the time T or a higher level P. Again, as in the other conditions noted, compensation for laminations in the plate area is provided. The establishing of a more strict standard for the overlap area or central area of the weld is emphasized when it is noted that signals from the overlap area are generally stronger than signals from the edge areas of the weld. If the threshold level for defect classification were the same for all areas, threshold level for the central area would be correspondingly lower because of the presence of stronger signals. Just the opposite is achieved by establishing a lower defect classification level in the central area.

Finally, in condition 5, if signals in either plate area exceed a relatively high threshold level TH, an output indication will be given.

The above conditions are reduced in tabular form in Table 1, as follows:

TABLE 1

| | Weld area outputs | | | | Plate area outputs | | | | | Coupling indicator outputs | |
|---|---|---|---|---|---|---|---|---|---|---|---|
| | Output A | Output B | Output C | Output D | Output E | Output F | Output G | Output H | Output I | Output J | Output K |
| Weld area No. 1 | Greater than P | | Greater than R for time greater than T | | Greater than R | | Greater than R | | | | |
| Plate area No. 1 | Less than R | | Less than R | | | Less than R | Less than R | | | | |
| Weld area No. 2 | | Greater than P | | Greater than R for time greater than T | | Greater than R | Greater than R | | Greater than TH | | |
| Plate area No. 2 | | Less than R | | Less than R | | Less than R | Less than R | | Greater than TH | | |
| Coupling | | | | | | Lost | | | | Good | Lost |

In Table 1 outputs A and B correspond to condition 1. Outputs C and D correspond to condition 2. Outputs E and F correspond to condition 3; output G corresponds to condition 4; outputs H and I correspond to condition 5. Two coupling indicator outputs J and K have been provided representative of good or poor coupling and are provided by the circuit of FIG. 3, the coupling indicator blocks 70 and 74.

Figure 7:
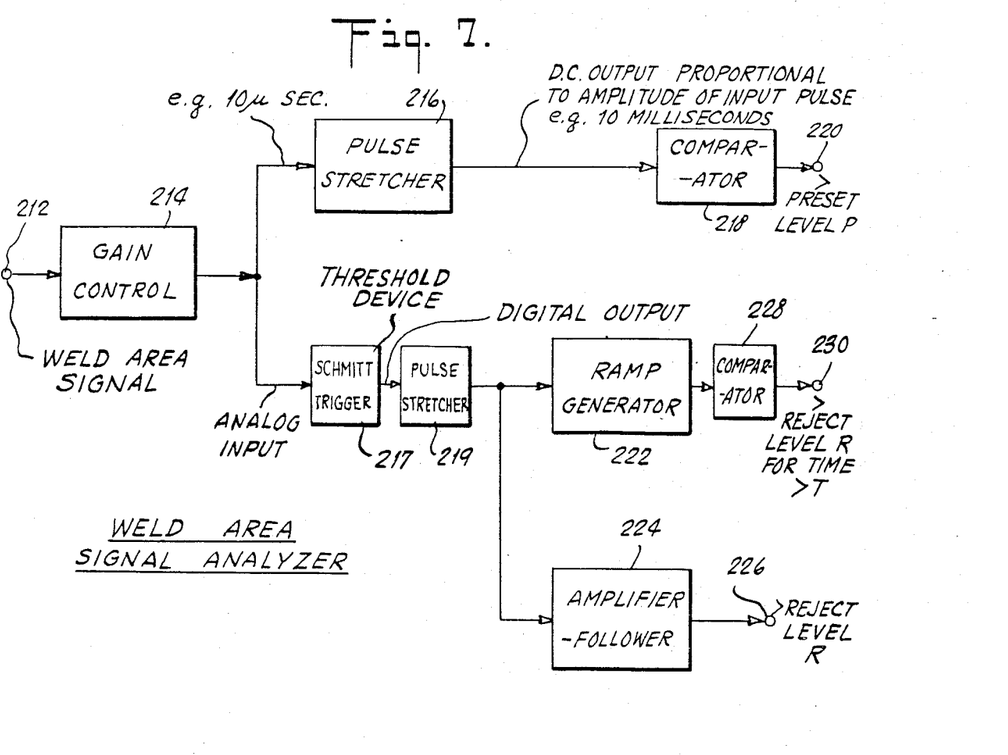
FIGS. 7 and 8 are block diagrams of representative signal analyzers useful in the system of FIG. 6.
Figure 8:
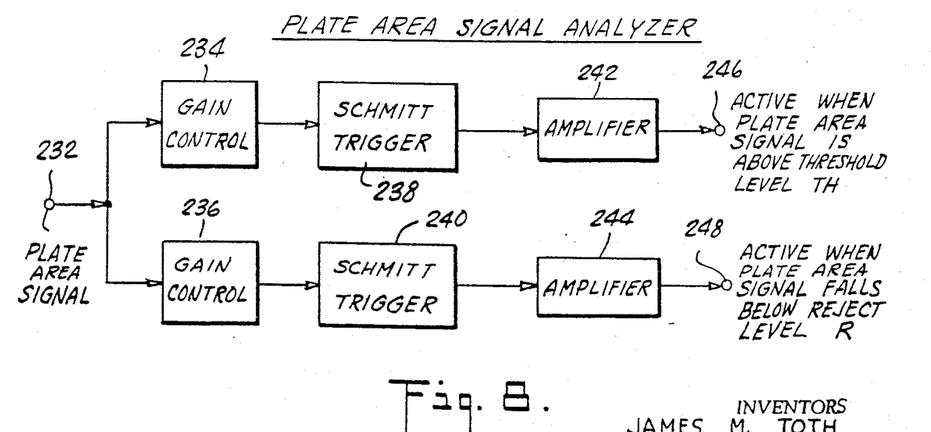

Referring again to FIG. 6, the circuit shown in the figure instruments the logic of Table 1. To this end four signal analyzers 142, 144, 146 and 148 are employed receiving signals from circuits such as shown in FIG. 5 and respectively representing signals from weld area No. 1, plate area No. 1, weld area No. 2 and plate area No. 2. Representative forms of the signal analyzers are shown in FIGS. 7 and 8, to be described later. Each signal analyzer compares the signals applied thereto against various references and generates output signals representative of the comparisons.

Signal analyzer 142 takes weld area No. 1 signals and generates an output on conductor 150 if a preset level P is exceeded. A signal is generated on an output conductor 152 if the signals from weld area No. 1 exceed reject level R for a time greater than T seconds. An output signal is generated on conductor 154 if the signals from the weld area No. 1 exceed the reject level R.

In similar fashion, signal analyzer 144 generates output signals on conductors 156 and 158 when signals from plate area No. 1 are respectively less than reject level R and greater than threshold level TH.

Signal analyzer 146 generates signals similar to those generated by signal analyzer 142 on output conductors 160, 162 and 164 in connection with signals received from weld area No. 2. Signal analyzer 148 is similar to analyzer 144 and generates output signals on conductors 166 and 168 when the signals from plate area No. 2 are respectively less than reject level R and greater than threshold level TH.

Considering outputs A and B of Table 1 corresponding to condition 1 above, output A is traced as follows: the signal from weld area No. 1 must be greater than preset level P. If this is the case, conductor 150 is energized. The signal passes through OR gate 170 energizing one input of AND gate 172. The other input to the AND gate is received from conductor 156, which is energized if reject level R is not exceeded in plate area No. 1. The output of AND gate 172 is thus energized, energizing OR gate 174. The output of the OR gate appears on conductor 176, which is coupled to an AND gate 178. The other input of the AND gate is received from an OR gate 180 which is in turn connected to terminals 100 and 102 receiving triggers No. 1 and No. 2. These trigger signals are generated, as noted above in connection with FIG. 4, during the times that the two transducers are pulsed. Thus the AND gate is energized by the OR gate 180 for the duration of each trigger pulse.

The AND gate 178 is coupled to a monostable multivibrator 182 which generates an output pulse that activates a weld area marking unit 184 to provide an indication of a defect in the weld area, in this case output A of Table 1 above.

Tracing through output B, the energization of conductor 160 from signal analyzer 146 and conductor 166 from signal analyzer 148 causes the energization of AND gate 186 (the signal from conductor 160 is applied to the AND gate through OR gate 188). The AND gate 186 energizes the OR gate 174, as noted above, ultimately to provide an output indication by the weld area marking unit 184, as just noted.

Tracing output C of Table 1, its conditions are met when conductor 152 from signal analyzer 142 and conductor 156 from signal anslyzer 144 are energized. Energization of these conductors leads to the energization of AND gate 172 which, as described above, ultimately causes weld area marking unit 184 to be activated.

Similarly for output D, conductor 162 from signal analyzer 146 is energized, along with conductor 166 from signal analyzer 148. Energization of these two conductors leads to the enabling of AND gate 186, leading to the activation of weld area marking unit 184, as explained above.

In connection with output E of Table 1, the signals from weld area No. 1 must be greater than the reject level R. When this is the case, conductor 154 from signal analyzer 142 is energized. The signals from plate area No. 1 must be less than the reject level R, resulting in conductor 156 from signal analyzer 144 being energized. Energization of the two conductors 154 and 156 enables AND gate 190, the output of which is applied through an OR gate 192 to an AND gate 194. The other input to the AND gate is received from terminal 140, and is active when coupling is lost. Thus AND gate 194 is energized when all of the conditions set forth under output E of Table 1 have been satisfied. The OR gate 174 is energized leading to the activation of the weld area marking unit 184. Output F from Table 1 is similar to output E, the conditions being satisfied for weld area No. 2 and plate area No. 2 along with a loss of coupling. Output conductor 164 from signal analyzer 146 is energized, as is output conductor 166 from signal analyzer 148. An AND gate 196 is enabled, providing an input to AND gate 194 through OR gate 192. The other input to the AND gate 194 is energized by the loss of coupling signal from terminal 140, as described above.

Output G of Table 1 is traced in the circuit of FIG. 6 as follows: Signals from weld area No. 1 greater than the reject level R cause conductor 154 from signal analyzer 142 to be energized. Signals from plate area No. 1 less than the reject level R cause conductor 156 to be energized. AND gate 190 is thereby enabled, the output of which is coupled to an AND gate 198. Similarly signals from weld area No. 2 greater than reject level R cause output conductor 164 from signal analyzer 146 to be energized. Signals from plate area No. 2 less than the reject level R cause conductor 166 from signal analyzer 148 to be energized. AND gate 196 is thereby enabled, the output of which is also applied to AND gate 198. The energization of AND gate 198 causes the output conductor 176 from OR gate 174 to be energized, leading to the activation of weld area marking unit 184.

Outputs H and I are the plate area outputs and are active whenever the plate area signals are greater than a threshold level TH. Tracing output H, the signals from plate area No. 1 are determined to be greater than the threshold level TH; thus output conductor 158 from signal analyzer 144 is energized. This output conductor is connected to an AND gate 200 which receives as its other input the signal trigger No. 1 from terminal 100. The signal trigger No. 1 is active during the time that transducer No. 1 is pulsed. Thus the AND gate 200 is energized when the plate area No. 1 signals are greater than the threshold level TH, causing a monostable multivibrator 202 to be activated. This multivibrator energizes a plate area No. 1 marking unit 204 to provide a suitable marking of the plate indicating a defect in plate area No. 1.

Similarly output I of Table 1 is in connection with signals from plate area No. 2 being detected as greater than a threshold level TH. Output conductor 168 from signal analyzer 148 is energized under this condition and energizes one input of AND gate 206. The other input of the AND gate is energized by the signal trigger No. 2 from terminal 102. The AND gate 206 energizes monostable multivibrator 208 which in turn activates plate area No. 2 marking unit designated 210 in FIG. 6. Accordingly major defects in plate area No. 2 result in the suitable marking of the plate area by the marking unit.

The remaining two outputs J and K of Table 1 are coupling indicator outputs. These outputs are not shown in FIG. 6 but rather are part of the circuit of FIG. 3. Output J, for example, may be derived from test block 74 in FIG. 3 indicating satisfactory coupling, while output K may be derived from the no test or coupling lost block 70 in FIG. 3.

FIG. 7

FIG. 7 is a block diagram of a representative weld area signal analyzer useful in the system of FIG. 6. The circuit shown in FIG. 7 may instrument either of the weld area signal analyzers 142 and 146. A weld area signal is received at terminal 212 corresponding to terminal 112a or 114a in FIG. 6. A gain control unit 214 varies the amplitude of the signal as desired and supplies output signals to a pulse stretcher 216 and a threshold device 217, such as a Schmitt trigger. The pulse stretcher 216 provides a DC output signal generally of varying amplitude that is proportional to the amplitude of the input pulse signal. The output signal from the pulse stretcher is much longer in duration than the input signal. For example, the input pulse signal may be 10 microseconds in duration, while the output signal may be 10 milliseconds in duration. The signal from the pulse stretcher 216 is applied to a comparator 218 which is set to a predetermined reference, typically variable in accordance with different defect levels. In any event, the comparator 218 generates an output signal at terminal 220 if the input signal exceeds the reference. In the context of the system of FIG. 6, the comparator 218 generates an output signal at the terminal 220 if the input signal exceeds the preset level P. The terminal 220 corresponds to the output conductor 150 or 160 from the signal analyzer 142 or 146.

The threshold device 217 provides a digital output signal whenever the input signal exceeds a predetermined threshold. The threshold in this case, again which is generally variable to account for different factors, corresponds to the reject level R in the system of FIG. 6. If the reject level is exceeded, the Schmitt trigger generates an output signal which is applied via a pulse stretcher 219 to a ramp generator 222 and an amplifier-follower 224. The amplifier-follower generates an output signal at terminal 226 (corresponding to conductor 154 from signal analyzer 142 or conductor 164 from signal analyzer 146). This signal is active whenever the reject level is exceeded by the weld area signal.

The ramp generator 222 generates a time varying signal which is initiated at the time of the digital output signal from the Schmitt trigger 217. The signal from the ramp generator is applied to a comparator 228 which compares the ramp signal with a predetermined reference representing the time T in the system of FIG. 6. When the signal from the ramp generator exceeds the reference, an output signal is generated at terminal 230 corresponding to conductor 152 or 162 in FIG. 6. The signal at the terminal 230 indicates that the reject level R has been exceeded for a time greater than T, indicating that a defect has persisted for a given length of time in the weld area as detected by one of the transducers.

FIG. 8

FIG. 8 is a block diagram of a representative plate area signal analyzer instrumenting either of the signal analyzers 144 or 148 of FIG. 6. A plate area signal is applied to terminal 232. This terminal corresponds to terminal 112b or 114b of FIG. 6. The plate area signal is applied to two gain control units 234 and 236 which adjust the amplitude of the signal. Each of these units is connected in turn to a threshold device or Schmitt trigger 238 or 240. The Schmitt triggers in turn are coupled through amplifiers 242 and 244 to terminals 246 and 248. The Schmitt trigger 238 is set to provide an output signal whenever the input plate area signal is above a predetermined reference level representing the threshold level TH. The Schmitt trigger 240 generates an output signal whenever the input plate area signal falls below a predetermined reference representing the reject level R in the system of FIG. 6. These references are generally variable to accommodate different test conditions.

What is claimed is:

1. A method of testing a metallic article that includes a weld seam therein for flaws, comprising:
    a. introducing signals into the article;
    b. detecting signals from the article and characterizing them as from a first region that includes a portion of the weld seam and a second region of the article adjacent to the weld seam;
    c. establishing individual thresholds for the first and second regions;
    d. comparing the detected signals from the different regions with the associated established thresholds and
    e. generating an output flaw signal for the first region when the first region detected signal exceeds its threshold indicating an anomaly in the article and the second region detected signal is less than its threshold indicating the absence of a lamination in the second region.

2. A method according to claim 1, in which the established thresholds for said two regions are different.

3. A method according to claim 1, including generating said output flaw signal when the detected signal from the first region exceeds a threshold R for at least a time T, and the detected signal from the second region is less than the threshold R.

4. A method according to claim 1, including characterizing signals also as from a third region of the article that includes another portion of the weld seam and a fourth region of the article adjacent to the weld seam on the side opposite from the second region, and generating an output flaw signal when the detected signals from the first and third regions are each greater than a threshold R and the detected signals from the second and fourth regions are each less than the threshold R.

5. Apparatus for testing a metallic article that includes a weld seam therein for flaws, comprising:
    a. means for introducing signals into the article;
    b. means for detecting signals from the article and characterizing them as from a first region that includes a portion of the weld seam and a second region of the article adjacent to the weld seam;
    c. means for establishing individual thresholds for the first and second regions;
    d. means for comparing the detected signals from the two regions with the associated established thresholds and
    e. means responsive to the means (d) for generating an output flaw signal for the first region when the first region detected signal exceeds its threshold indicating an anomaly in the article and the second region detected signal is less than its threshold indicating the absence of a lamination in the second region.

6. Apparatus according to claim 5, in which the means (c) includes means for establishing different thresholds for the two article regions.

7. Apparatus according to claim 5, in which the means (e) includes means for generating said output flaw signal when the detected signal from the first region exceeds a threshold R for at least a time T, and the detected signal from the second region is less than the threshold R.

8. Apparatus according to claim 5, in which the means (b) includes means for characterizing the detected signals from the article as from a third region that includes another portion of the weld seam and a fourth region of the article adjacent to the weld seam on the side opposite from the second region, and the means (e) includes means for generating an output flaw signal when the detected signals from the first and third regions are each greater than a threshold R and the detected signals from the second and fourth regions are each less than the threshold R.

9. A method according to claim 1, in which the signals that are introduced into the article are ultrasonic.

10. Apparatus according to claim 5, in which the means (a) comprises means for introducing ultrasonic signals into the article.

* * * * *